(12) United States Patent
Sadeh

(10) Patent No.: US 9,140,467 B2
(45) Date of Patent: Sep. 22, 2015

(54) SOLAR ENERGY SYSTEM

(76) Inventor: Avraham Sadeh, Raanana (IL)

( * ) Notice: Subject to any disclaimer, the term of this patent is extended or adjusted under 35 U.S.C. 154(b) by 0 days.

(21) Appl. No.: 14/004,165

(22) PCT Filed: Mar. 13, 2012

(86) PCT No.: PCT/IL2012/000116
§ 371 (c)(1),
(2), (4) Date: Oct. 3, 2013

(87) PCT Pub. No.: WO2012/123934
PCT Pub. Date: Sep. 20, 2012

(65) Prior Publication Data
US 2014/0014090 A1    Jan. 16, 2014

(30) Foreign Application Priority Data
Mar. 13, 2011 (IL) .......................... 211695

(51) Int. Cl.
| | | |
|---|---|---|
| F24J 2/42 | (2006.01) |
| F24J 2/30 | (2006.01) |
| F03G 6/06 | (2006.01) |
| F24J 2/34 | (2006.01) |
| F24J 2/46 | (2006.01) |

(52) U.S. Cl.
CPC . *F24J 2/30* (2013.01); *F03G 6/067* (2013.01); *F24J 2/345* (2013.01); *F24J 2/46* (2013.01); *Y02E 10/46* (2013.01)

(58) Field of Classification Search
CPC ................ Y02E 10/44; F24J 2/05; F24J 2/07; F24J 2/0007; F24J 2/34; F24J 2/30; F24J 2/46
USPC ..................................... 126/609, 641
See application file for complete search history.

(56) References Cited

U.S. PATENT DOCUMENTS

| | | | | |
|---|---|---|---|---|
| 4,286,575 A | * | 9/1981 | Gates | 126/592 |
| 4,407,129 A | * | 10/1983 | Johnston | 60/641.8 |
| 4,527,618 A | * | 7/1985 | Fyfe et al. | 126/635 |
| 2005/0087186 A1 | * | 4/2005 | Stahl | 126/640 |
| 2009/0249779 A1 | * | 10/2009 | Shiao | 60/517 |
| 2012/0011851 A1 | * | 1/2012 | Lievre | 60/641.15 |

FOREIGN PATENT DOCUMENTS

| | | | |
|---|---|---|---|
| FR | 2323874 | * | 5/1977 |
| FR | 2323874 A | * | 5/1977 |
| WO | WO2009113954 | * | 9/2009 |
| WO | WO 2009113954 A1 | * | 9/2009 |
| WO | WO2009124538 | * | 10/2009 |
| WO | WO 2009124538 A2 | * | 10/2009 |

* cited by examiner

*Primary Examiner* — Steven B McAllister
*Assistant Examiner* — George R Blum
(74) *Attorney, Agent, or Firm* — Edward Langer ADV. & Patent Attorney

(57) ABSTRACT

A solar energy system comprising: solar collector having thermo-oil piping and three thermo-oil valves; three tanks each having steam inlet and outlet valves; an electric generator device downstream of the three tanks; and a controller, wherein a flow of thermo-oil is alternatively controllable to flow into each of the three tanks wherein fluid in the three tanks is alternatively heatable to a gaseous phase and providable to the electric generator device for producing electrical energy.

16 Claims, 1 Drawing Sheet

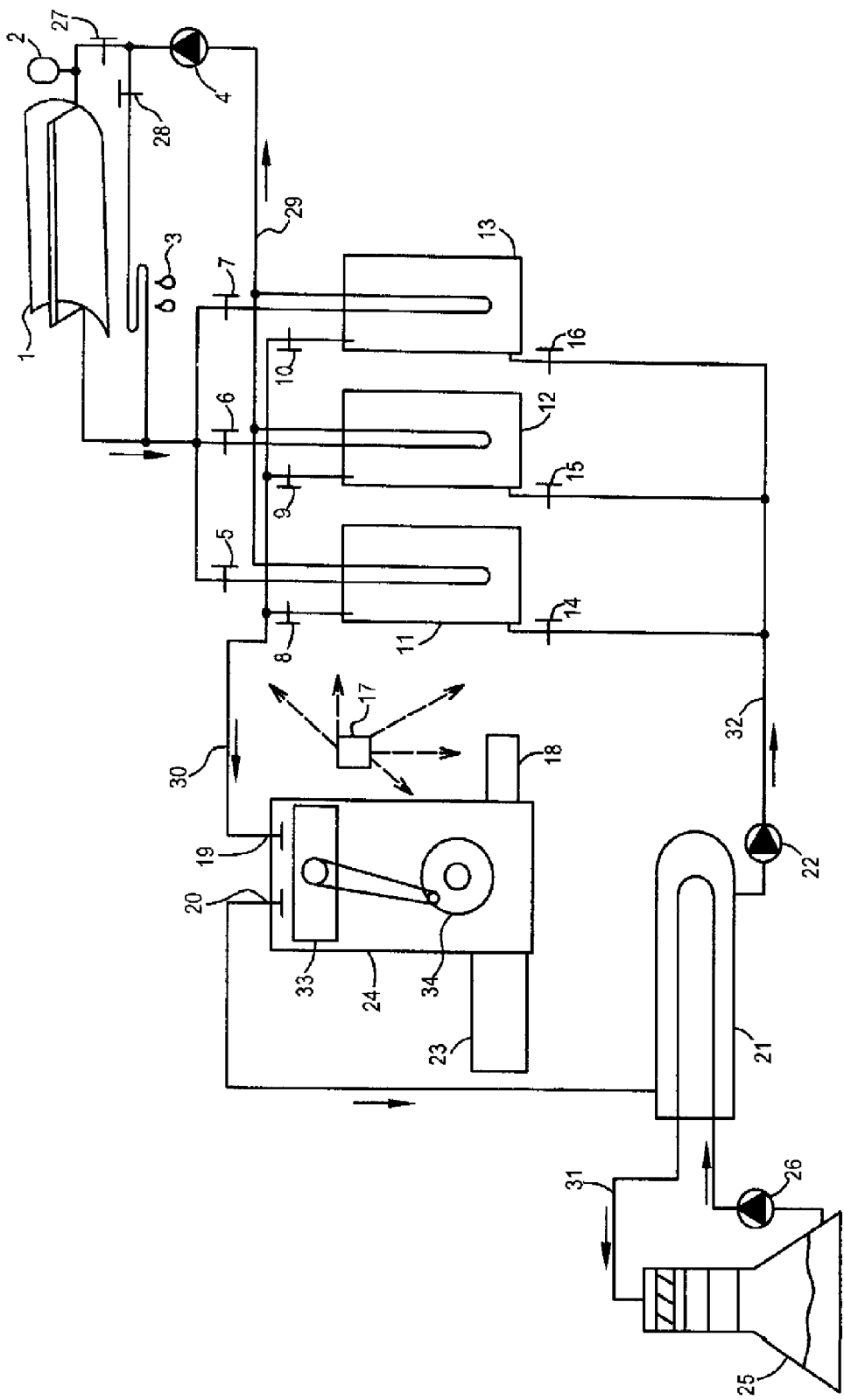

SOLAR ENERGY SYSTEM

FIELD OF THE INVENTION

The present invention relates to an energy system, in particular such system for providing electrical energy.

BACKGROUND OF THE INVENTION

An energy system provides a means for deriving energy (e.g. electrical and/or thermal) from another form of energy.

U.S. Pat. No. 4,409,129 (Johnston) discloses a closed loop solar collector system including a linear concentrating parabolic reflector, a linear vaporizer tube horizontally aligned along the focal line of the parabolic reflector, and a fluid metering assembly attached to the input end of the vaporizer tube for precisely metering a quantity of a vaporizable heat transfer fluid from a supply tank to the vaporizer tube. Solar energy concentrated by the parabolic reflector on the vaporizer tube vaporizes the heat transfer fluid. The heated vapor flows out the outlet end of the tube opposite the fluid metering assembly through a pipe and enters a heat exchanger. The heat exchanger contains a heat absorptive medium which absorbs heat from the vaporized fluid to cause the fluid to condense and release its latent heat of vaporization to the heat absorptive medium. The condensed fluid flows back to the heat storage tank for re-use under pressure provided by the vaporized fluid entering the heat exchanger. A thermoelectric generating system using the present closed loop solar system is connected to the heat exchanger and utilizes a separate loop with a working fluid, such as ammonia, to drive an electric generator.

U.S. Pat. No. 4,171,617 (Sakamoto et al) describes a solar thermal electric power system in which a solar collector; a heat storage vessel filled with a thermal storage material adapted to effect a phase change between solid and liquid internally; a turbine; a condenser; a condensate storage tank; and a feed water pump are connected in a closed loop by suitable conduits. A first control valve is provided en route between the solar collector and a heat storage vessel. A steam accumulator filled with water is connected via a second control valve in a pipe route between the solar collector and the first control valve, as well as to a pipe route between the first control valve and the heat storage vessel via a third control valve. The temperature of a fluid flowing out of the solar collector is detected, and when the temperature detected is to be lower than a set temperature, then the first control valve is controlled so as to be closed, while the second control valve is opened.

U.S. Pat. No. 4,176,655 (Levy) discloses a solar energy collection and utilization storage system constructed by using a lenticulated transparent element closed at the back to form channels which are used to carry an energy storage fluid. The lenticulations are designed as light trapping surfaces so that virtually all of the energy from the sun at any time of day falling on the sheet is trapped by the lenticulations and transferred to an energy storage fluid which is in the passages formed by the lenticulations and the back cover panel. The rate of flow through the solar collector panel is controlled by a thermostatic valve element which opens the flow when the fluid reaches a predetermined temperature. The energy storage fluid is a dispersion of a crystalline polymer in a heat transfer fluid which has the capacity of storing heat by a latent heat of crystallization as well as by sensible heat. By use of a suitable polymer the energy storage fluid can store energy at a high enough temperature to produce a significant amount of shaft power utilizing a heat engine. The remainder of the system comprises a storage container, suitable fluid connecting lines, a heat exchanger to extract sensible heat, and means to circulate the fluid through the system. The combination of the flat panel collector and the efficient energy storage fluid combine to make an effective collector system which can be employed to drive a heat pump for heating and cooling or to generate electric power.

The disclosure of the cited art is fully incorporated herein by reference.

SUMMARY OF THE INVENTION

The present invention relates to a closed loop thermal energy system.

Hot fluid, typically thermo-oil (herein the specification and claims "thermo-oil", however intended to denote any appropriate heat exchange fluid), heated by and exiting a heating mechanism (e.g. a solar collector or other heating means) of the system is alternately introduced into three tanks where water or other suitable fluid (e.g. alcohol, etc; hereinafter: water) is heated. The water in the tanks is alternately boiled and the resulting steam flows into an electric generator device. Steam exiting the electric generator device is typically cooled by a heat exchanger whereby thermal energy can also be obtained from the system. The now partially cooled steam re-circulates into one of the two tanks; i.e. one of the tanks from which steam did not exit. Thus, one of the tanks is hot, having been heated by the thermo-oil, and is providing steam to the electric generator device; another of the tanks is being heated by the thermo-oil; and the third tank is receiving recycled steam, but is not being heated by the thermo-oil. A controller controls the tank valves whereby the aforementioned heating occurs, alternating the functions between the three tanks. Thus, there can more readily be steam available from at least one of the tanks in order to operate the electric generator device.

Accordingly, in embodiments of one aspect of the invention there is provided a system as defined in claim 1; and particular embodiments are defined in claims depending therefrom.

BRIEF DESCRIPTION OF THE DRAWINGS

The invention may be understood upon reading of the following detailed description of non-limiting an exemplary embodiments thereof, with reference to the following drawings.

Identical or duplicate or equivalent or similar structures, elements, or parts that appear in more than one drawing are generally labeled with the same reference numeral. Dimensions of components and features shown in the figures are chosen for convenience or clarity of presentation and are not necessarily shown to scale or true perspective. For clarity, some structures are not shown or shown only partially, or without perspective, and duplicate or equivalent or similar parts may not be repeatedly labeled.

FIG. 1 is a schematic view of an embodiment of a solar energy system in accordance with the present invention.

DESCRIPTION OF EMBODIMENTS OF THE INVENTION

The following description relates to some non-limiting examples of embodiments of the invention.

FIG. 1 shows a schematic representation of an embodiment of the present solar energy system. The system includes a solar collector, such as a parabolic concentrating solar collector 1; a trio of tanks 11, 12 and 13; an electric generator device 24; and a controller 17.

Electric generator device 24 comprises a starter 18 for starting operation of device 24; and an alternator 23, for producing electricity when device 24 is in operation.

Solar collector 1 has associated therewith piping 29. Piping 29 includes tank oil-inlet valves 5, 6 and 7—respectively of tanks 11, 12 and 13. Piping 29 has a pump 4 for circulating thermo-oil and typically an overflow tank 2, for safety. In some embodiments, the system further includes a back-up heating source 3, typically using a fossil fuel or the like for heating oil in piping 29, and typically including a valve 28, when there is insufficient solar energy available. In this regard, piping 29 may thus also include a valve 27, which in concert with valve 28 controls the ratio of thermo-oil heated by solar collector 1 and heating source 3.

Tanks 11, 12 and 13 have resepective fluid inlet valves 14, 15 and 16; and respective steam outlet valves 8, 9 and 10. Outlet valves 8, 9 and 10 lead to steam outlet piping 30 which leads to an inlet 19 of electric generator device 24. Electric generator device 24 also has a steam outlet valve 20 from which steam exits. In some embodiments, the system further includes heat exchanger 21 which is useful to provide thermal energy by way of an auxiliary heat exchanger 25 via a fluid ciruculated by pump 26 in auxiliary heat exchanger piping 31.

Steam exiting electric generator device 24 flows back into one of the tanks (tanks 11 or 12 or 13, as will be detailed below) via piping 32, which may have an associated pump 22. Electric generator device 24 may be provided as a piston-operated steam engine based on reciprocating motion of a 2-stroke piston 33, driving crankshaft 34 which in turn drives alternator 23.

The system further typically includes a series of thermal and pressure sensors (not shown).

Operation will be explained by the following example:

Tanks 11 and 12 begin about ⅔'s full of water; and tank 13 begins about ⅓ full of water. The all the valves of the system are firstly closed. To begin operation, controller 17 opens valves 5, 6 and 7; and operates pump 4. By way of example, all the tanks 11, 12 and 13 are initially heated to about 300° C. Then, valves 6 and 7 are closed and tank 11 continues to be heated to about 400° C. and a pressure of about 220 atm. Starter 18 is then operated to initiate electric generator device 24. Then valve 8 is opened whereby steam flows from tank 11 via inlet 19 into electric generator device 24; and valve 16 is opened whereby steam recycles and enters tank 13. Valve is also opened whereby tank 12 will be further heated, for example to about 400° C. In this scenario, tank 11 is providing steam to electric generator device 24; tank 12 is being heated by the thermo-oil; and tank 13 is receiving steam that has exited electric generator device 24. When the pressure in tank 11 falls to about 180 atm, valve 8 is gradually closed; valve 9 is gradually opened; and valve 14 is gradually opened. Valve 7 is also opened and valves 5 and 16 are closed. In this scenario, tank 11 is receiving steam that has exited electric generator device 24; tank 12 is providing steam to electric generator device 24; and tank 13 is being heated by the thermo-oil.

When the pressure in tank 12 falls to about 180 atm, valves 6 and 9 are gradually closed; and valve 15 is gradually opened. Valve 5 is also opened to again heat tank 11 and the operation repeats.

Repetition of the above cycle causes: the water/steam in tanks 11, 12 and 13 to be alternatively heated by the thermal-oil; steam to continuously flow to electric generator device 24; and steam to be received from electric generator device 24.

The present invention has been described using descriptions of embodiments thereof that are provided by way of example and are not intended to limit the scope of the invention. The described embodiments comprise various features, not all of which are necessarily required in all embodiments of the invention. Some embodiments of the invention utilize only some of the features or possible combinations of the features. Alternatively and additionally, portions of the invention described/depicted as a single unit may reside in two or more separate physical entities which act in concert to perform the described/depicted function. Alternatively and additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment.

The invention claimed is:

1. A closed loop energy system for efficiently converting solar energy to electrical energy and residual thermal energy, said system comprising:

a heating system for heating a heat exchange fluid in a first closed loop;

a set of three tanks of heat exchangers (11,12,13) receiving said heat exchange fluid, each of said heat exchangers adapted to hold a first suitable working fluid consisting of alcohol, for producing working steam therefrom in a second closed loop;

a piston-operated steam engine (24) downstream of said set of three tanks of heat exchangers (11, 12, 13), for producing electrical energy from said working steam transferred thereto in said second closed loop;

a cooling system comprising a heat exchanger (21) for cooling residual steam exiting said piston-operated steam engine (24) via an outlet valve (20) thereof; and a controller (17) for controlling cyclical operation of said closed loop energy system, wherein said heating system comprises:

at least a parabolic concentrating solar energy heat collector (1) being connected via piping (29) including an overflow tank (2), to said set of three tanks of heat exchangers (11, 12, 13) adapted to hold said first suitable working fluid, said piping (29) containing said heat exchange fluid; and a pump (4) for controlling the flow of said heat exchange fluid through said piping (29) so as to distribute it respectively, via three heat exchange fluid valves (5, 6, 7), each associated with one of said set of three tanks of heat exchangers (11,12,13), said heat exchangers being connected via said piping (29) in said first closed loop to receive said distributed heat exchange fluid via said heat exchange fluid valves (5, 6, 7), said heat exchange fluid being returned via a valve (27) associated with said solar energy heat collector (1);

wherein said piston-operated steam engine (24) has a single piston (33) and each of a steam inlet valve (19) and a steam outlet valve (20), and operates by reciprocating motion in a 2-stroke cycle in a single cylinder, only initially activated by a starter (18), for producing said electrical energy via an alternator (23) integrally connected to said piston-operated steam engine (24);

wherein each of said set of heat exchangers has associated therewith, respectively, a set of fluid inlet valves (14, 15, 16) and steam outlet valves (8, 9, 10), said steam outlet valves (8, 9, 10) being connected to said piston-operated steam engine (24) via piping (30) through a steam inlet valve (19) of said piston-operated steam engine (24); and wherein in operation of said heating system, a flow of said heat exchange fluid is alternatively controlled to flow into each of said three tanks of heat exchangers (11, 12, 13) so that said first suitable working fluid in each of said three tanks is alternatively heated to working steam of said first suitable working fluid by thermally efficient conversion, due to the low thermal boiling point of alcohol and the low latent heat of vaporization needed, thus maximing the efficient use of the collected solar heat energy, said working steam being provided to said piston-operated steam engine (24) in said second closed loop for producing said electrical energy, whereby when said first suitable working fluid in one of said three tanks of heat exchangers (11, 12, 13) is heated and provides said working steam via said steam outlet valves (8, 9, 10) to said piston-operated steam engine (24) via said piping (30), a second tank of said three tanks is then heated to replace the first tank and only a third tank of said three tanks which is not yet heated collects said residual steam exiting via said steam outlet valve (20) of said piston-operated steam engine (24), said collected residual steam afterwards being cooled by said cooling system, and returned via a pump (22) connected with piping (32) to return said cooled residual steam as said first suitable working fluid to said third tank via said fluid inlet valves (14, 15, 16), and wherein said three tanks automatically and alternatingly exchange their functions in a serial, sequential, cyclical fashion by the control of said controller (17), such that said cyclical operation makes working steam continuously available for operation of said piston-operated steam engine (24), wherein said heat exchanger (21) in said cooling system is useful to extract residual thermal energy by way of an auxiliary heat exchanger (25) via a second suitable working fluid circulated in a third closed loop by a pump (26) connected with auxiliary heat exchanger piping (31), wherein said first and second closed loops work in common with said set of three heat exchangers (11, 12, 13), and wherein said second and third closed loops work in common with said heat exchanger (21), such that said second closed loop cooperates with both said first and third closed loops, providing system integration for increased efficiency.

2. The system according to claim 1, wherein said piping (29), pump (4), valves (27, 28), overflow tank (2), and collector (1), containing said heat exchange fluid is said first closed loop, wherein said heat exchangers (11, 12, 13) holding said first suitable working fluid within which said working steam circulates via said piping (30, 32), is said second closed loop, and wherein said heat exchanger (21) and said auxiliary heat exchanger (25) in said cooling system is said third closed loop which circulates said second suitable working fluid via said piping (31), to restore said cooled residual steam in said piping (32) to a fluid phase of said first suitable working fluid.

3. The system according to claim 1, wherein the system (FIG. 1) is implementable in a modular fashion for combination with one or more other systems.

4. The system according to claim 1, wherein said piston-operated steam engine (24) operates on a pressure differential between said inlet valve (19) and said outlet valve (20).

5. The system according to claim 1, wherein said heat exchangers (11, 12, 13) are operable at various temperatures and pressures up to at least one of 400 ° C. and 220 Atmospheres.

6. The system according to claim 1, wherein said heating system further comprises a back-up heating source (3) utilizing heat energy from a fossil fuel heating source in a closed loop, when there is insufficient solar energy available for said heating system.

7. The system according to claim 1, wherein said heating system further comprises a back-up heating source (3) utilizing heat energy from a thermal conversion heating source, when there is insufficient solar energy available for said heating system.

8. The system according to claim 1, wherein said controller (17) controls said heat exchange fluid valves (5, 6, 7), steam valves (8, 9, 10), inlet and outlet valves (19,20) of said piston-operated steam engine (24), pumps (22, 26) and the starter (18) for operating automatically, alternately and alternatively all of the parts and portions including said first, second and third closed loops of said closed loop solar energy system.

9. The system according to claim 1, wherein portions of the heating system may be a single unit or may reside in a plurality of separate physical entities which may comprise different combinations of features which can be integrated to act in concert to perform functions of the solar energy system.

10. The system of claim 1 wherein portions of said set of heat exchangers (11, 12, 13) may reside in four or more separate physical entities.

11. The system of claim 1 wherein said second closed loop operates together with said piston-operated steam engine (24) using said working steam produced by one of said set of three heat exchangers (11, 12, 13) in automatic, alternate and alternating fashion so that said working steam is continuously available from at least one of said three heat exchangers (11, 12, 13) to operate said piston-operated steam engine (24).

12. A method of operating a closed loop energy system for efficiently converting solar energy to electrical energy and residual thermal energy, said method comprising:

providing a heating system for heating a heat exchange fluid in a first closed loop;

providing a set of three tanks of heat exchangers (11, 12, 13) receiving said heat exchange fluid, each of said heat exchangers adapted to hold a first suitable working fluid consisting of alcohol, for producing working steam therefrom in a second closed loop;

providing a piston-operated steam engine (24) downstream of said set of three tanks of heat exchangers (11, 12, 13), for producing electrical energy from said working steam transferred thereto in said second closed loop;

providing a cooling system comprising a heat exchanger (21) for cooling residual steam exiting said piston-operated steam engine (24) via an outlet valve (20) thereof;

providing a controller (17) for controlling cyclical operation of said closed loop energy system, wherein said heating system comprises:

at least a parabolic concentrating solar energy heat collector (1) being connected via piping (29) including an overflow tank (2), to [a] said set of three tanks of heat exchangers (11, 12, 13) adapted to hold said first suitable working fluid, said piping (29) containing [a] said heat exchange fluid; and a pump (4) for controlling the flow of said heat exchange fluid through said piping (29) so as to distribute it respectively, via three heat exchange fluid valves (5, 6, 7), each associated with one of said set of three tanks of heat exchangers (11, 12, 13), said heat exchangers being connected via said piping (29) in [a] said first closed loop to receive said distributed heat exchange fluid via said heat exchange fluid valves (5, 6, 7), said heat exchange fluid being returned via a valve (27) associated with said solar energy heat collector (1);

wherein said piston-operated steam engine (24) has a single piston (33) and each of a steam inlet valve (19) and a steam outlet valve (20, and operates by reciprocating motion in a 2-stroke cycle in a single cylinder, only initially activated by a starter (18), for producing said electrical energy via an alternator (23) integrally connected to said piston-operated steam engine (24);

wherein each of said set of heat exchangers has associated therewith, respectively, a set of fluid inlet valves (14, 15, 16) and steam outlet valves (8, 9, 10), said steam outlet valves (8, 9, 10) being connected to said piston-operated steam engine (24) via piping (30) through a steam inlet valve (19) of said piston-operated steam engine (24);

and operating said heating system, by controlling a flow of said heat exchange fluid alternatively to flow into each of said three tanks of heat exchangers (11, 12, 13) so that said first suitable working fluid in each of said three tanks is alternatively heated to working steam of said first suitable working fluid by thermally efficient conversion, due to the low thermal boiling point of alcohol and the low latent heat of vaporization needed, thus maximing the efficient use of the collected solar heat energy, said working steam being provided to said piston-operated steam engine (24) in said second closed loop for producing said electrical energy, whereby when said first suitable working fluid in one of said three tanks of heat exchangers (11, 12, 13) is heated and provides said working steam via said steam outlet valves (8, 9, 10) to said piston-operated steam engine (24) via said piping (30), a second tank of said three tanks is then heated to replace the first tank and only a third tank of said three tanks which is not yet heated collects said residual steam exiting via said steam outlet valve (20) of said piston-operated steam engine (24), said collected residual steam afterwards being cooled by said cooling system, and returned via a pump (22) connected with piping (32) to return said cooled residual steam as said first suitable working fluid to said third tank via said fluid inlet valves (14, 15, 16), and wherein said three tanks automatically and alternatingly exchange their functions in a serial, sequential, cyclical fashion by the control of said controller (17), such that said cyclical operation makes working steam continuously available for operation of said piston-operated steam engine (24), wherein said heat exchanger (21) in said cooling system is useful to extract residual thermal energy by way of an auxiliary heat exchanger (25) via a second suitable working fluid circulated in a third closed loop by a pump (26) connected with auxiliary heat exchanger piping (31), wherein said first and second closed loops work in common with said set of three heat exchangers (11, 12,13), and wherein said second and third closed loops work in common with said heat exchanger (21), such that said second closed loop cooperates with both said first and third closed loops, providing system integration for increased efficiency.

13. The method according to claim 12, wherein said piston-operated steam engine (24) operates on a pressure differential between said inlet valve (19) and said outlet valve (20).

14. The method according to claim 12, wherein said heat exchangers (11, 12, 13) are operable at various temperatures and pressures up to at least one of 400 ° C. and 220 Atmospheres.

15. The method according to claim 12, wherein said controller (17) controls said heat exchange fluid valves (5, 6, 7), steam valves (8, 9, 10), inlet and outlet valves (19,20) of said piston-operated steam engine (24), pumps (22, 26) and the starter (18) for operating automatically, alternately and alternatively all of the parts and portions including said first, second and third closed loops of said closed loop solar energy system.

16. The method of claim 12 wherein said second closed loop operates together with said piston-operated steam engine(24) using said working steam produced by one of said set of three heat exchangers (11, 12, 13) in automatic, alternate and alternating fashion so that said working steam is continuously available from at least one of said three heat exchangers to operate said piston-operated steam engine (24).

* * * * *